US009105019B1

(12) United States Patent
Faisal

(10) Patent No.: US 9,105,019 B1
(45) Date of Patent: Aug. 11, 2015

(54) METHOD AND SYSTEM FOR DEPOSITING FUNDS AT A POINT OF SALE TERMINAL

(75) Inventor: Mohammad S. Faisal, Nashua, NH (US)

(73) Assignee: Intuit Inc., Mountain View, CA (US)

(*) Notice: Subject to any disclaimer, the term of this patent is extended or adjusted under 35 U.S.C. 154(b) by 0 days.

(21) Appl. No.: 12/104,981

(22) Filed: Apr. 17, 2008

(51) Int. Cl.
| | | |
|---|---|---|
| *G06Q 20/00* | (2012.01) | |
| *G06Q 40/00* | (2012.01) | |
| *G06Q 20/20* | (2012.01) | |
| *G07G 1/12* | (2006.01) | |
| *G06Q 30/06* | (2012.01) | |
| *G06Q 30/02* | (2012.01) | |
| *G06Q 20/10* | (2012.01) | |
| *G06Q 40/02* | (2012.01) | |

(52) U.S. Cl.
CPC ............... *G06Q 20/20* (2013.01); *G06Q 20/10* (2013.01); *G06Q 20/102* (2013.01); *G06Q 20/108* (2013.01); *G06Q 20/204* (2013.01); *G06Q 30/02* (2013.01); *G06Q 30/06* (2013.01); *G06Q 40/00* (2013.01); *G06Q 40/02* (2013.01); *G07G 1/12* (2013.01)

(58) Field of Classification Search
CPC ....... G06Q 20/20; G06Q 30/06; G06Q 30/02; G06Q 20/204; G06Q 20/108; G06Q 40/02; G06Q 20/10; G06Q 40/00; G06Q 20/102
USPC ..................................................... 705/16, 42
See application file for complete search history.

(56) References Cited

U.S. PATENT DOCUMENTS

| | | | | |
|---|---|---|---|---|
| 5,220,501 | A * | 6/1993 | Lawlor et al. | 705/40 |
| 5,297,026 | A * | 3/1994 | Hoffman | 705/14.18 |
| 5,302,811 | A * | 4/1994 | Fukatsu | 235/380 |
| 5,715,298 | A * | 2/1998 | Rogers | 379/91.01 |
| 5,781,654 | A * | 7/1998 | Carney | 382/137 |
| 5,893,078 | A * | 4/1999 | Paulson | 705/35 |
| 5,966,698 | A * | 10/1999 | Pollin | 705/34 |
| 5,982,918 | A * | 11/1999 | Mennie et al. | 382/135 |
| 6,012,049 | A * | 1/2000 | Kawan | 705/41 |
| 6,021,400 | A * | 2/2000 | Gallacher et al. | 705/43 |
| 6,098,053 | A * | 8/2000 | Slater | 705/44 |
| 6,105,007 | A * | 8/2000 | Norris | 705/38 |
| 6,199,051 | B1 * | 3/2001 | Gifford | 705/75 |
| 6,223,168 | B1 * | 4/2001 | McGurl et al. | 705/40 |
| 6,424,706 | B1 * | 7/2002 | Katz et al. | 379/144.01 |
| 6,678,664 | B1 * | 1/2004 | Ganesan | 705/39 |
| 6,796,492 | B1 * | 9/2004 | Gatto | 235/379 |
| 6,827,260 | B2 * | 12/2004 | Stoutenburg et al. | 235/380 |
| 6,970,845 | B1 * | 11/2005 | Drummond et al. | 705/43 |

(Continued)

OTHER PUBLICATIONS

Mobile Banking: Putting a bank in Customers' pockets, Electronic Payments International Jul. 2007, 9 pages.*

(Continued)

*Primary Examiner* — Matthew Gart
*Assistant Examiner* — Harshad Parikh
(74) *Attorney, Agent, or Firm* — Osha·Liang LLP

(57) ABSTRACT

A method for depositing funds into a financial account. The method includes obtaining a deposit request by a point of sale (POS) terminal, where the deposit request includes a virtual account number and a deposit amount, where the deposit amount matches an amount of funds received; identifying a financial account number associated with the virtual account number; and depositing funds matching the deposit amount into a financial account corresponding to the financial account number.

10 Claims, 5 Drawing Sheets

(56) References Cited

U.S. PATENT DOCUMENTS

| | | | |
|---|---|---|---|
| 7,076,458 B2 * | 7/2006 | Lawlor et al. | 705/35 |
| 7,086,584 B2 * | 8/2006 | Stoutenburg et al. | 235/379 |
| 7,108,175 B2 * | 9/2006 | Eastman et al. | 235/379 |
| 7,177,846 B2 * | 2/2007 | Moenickheim et al. | 705/64 |
| 7,181,430 B1 * | 2/2007 | Buchanan et al. | 705/45 |
| 7,182,253 B1 * | 2/2007 | Long | 235/379 |
| 7,216,106 B1 * | 5/2007 | Buchanan et al. | 705/45 |
| 7,295,993 B1 * | 11/2007 | Meek et al. | 705/16 |
| 7,387,237 B2 * | 6/2008 | Main | 235/379 |
| 8,229,847 B2 * | 7/2012 | McKernan et al. | 705/39 |
| 8,332,317 B1 * | 12/2012 | McCoy et al. | 705/40 |
| 2002/0152124 A1 * | 10/2002 | Guzman et al. | 705/16 |
| 2002/0152176 A1 * | 10/2002 | Neofytides et al. | 705/64 |
| 2002/0156683 A1 * | 10/2002 | Stoutenburg et al. | 705/16 |
| 2002/0166891 A1 * | 11/2002 | Stoutenburg et al. | 235/379 |
| 2003/0023552 A1 * | 1/2003 | Kight et al. | 705/40 |
| 2003/0208405 A1 * | 11/2003 | Putman et al. | 705/16 |
| 2003/0209599 A1 * | 11/2003 | Gatto | 235/379 |
| 2004/0088243 A1 * | 5/2004 | McCoy et al. | 705/38 |
| 2004/0133516 A1 * | 7/2004 | Buchanan et al. | 705/42 |
| 2004/0138974 A1 * | 7/2004 | Shimamura et al. | 705/35 |
| 2004/0139008 A1 * | 7/2004 | Mascavage, III | 705/40 |
| 2004/0210530 A1 * | 10/2004 | Mitsumoto et al. | 705/42 |
| 2004/0215565 A1 * | 10/2004 | Huffman | 705/42 |
| 2004/0267666 A1 * | 12/2004 | Minami et al. | 705/43 |
| 2005/0060258 A1 * | 3/2005 | Murphy | 705/39 |
| 2005/0080731 A1 * | 4/2005 | Dnyaneshwar | 705/39 |
| 2005/0096986 A1 * | 5/2005 | Taylor et al. | 705/16 |
| 2005/0147225 A1 * | 7/2005 | Mallick et al. | 379/114.2 |
| 2005/0163362 A1 * | 7/2005 | Jones et al. | 382/137 |
| 2005/0177496 A1 * | 8/2005 | Blagg et al. | 705/39 |
| 2005/0177510 A1 * | 8/2005 | Hilt et al. | 705/40 |
| 2005/0203846 A1 * | 9/2005 | Noguchi | 705/42 |
| 2005/0203847 A1 * | 9/2005 | Drummond et al. | 705/43 |
| 2005/0267843 A1 * | 12/2005 | Acharya et al. | 705/42 |
| 2006/0080249 A1 * | 4/2006 | Keohane et al. | 705/42 |
| 2006/0122923 A1 * | 6/2006 | Burke | 705/35 |
| 2006/0180655 A1 * | 8/2006 | Meek et al. | 235/379 |
| 2006/0235777 A1 * | 10/2006 | Takata | 705/35 |
| 2006/0242085 A1 * | 10/2006 | Jones et al. | 705/64 |
| 2006/0255121 A1 * | 11/2006 | Putman et al. | 235/379 |
| 2007/0011089 A1 * | 1/2007 | DeSchryver | 705/39 |
| 2007/0071302 A1 * | 3/2007 | Jones et al. | 382/135 |
| 2007/0100750 A1 * | 5/2007 | Hartfield et al. | 705/43 |
| 2007/0168279 A1 * | 7/2007 | D'Angelo | 705/39 |
| 2007/0172107 A1 * | 7/2007 | Jones et al. | 382/137 |
| 2007/0208662 A1 * | 9/2007 | Jeronimus et al. | 705/44 |
| 2007/0239565 A1 * | 10/2007 | Pentel | 705/26 |
| 2007/0250450 A1 * | 10/2007 | Ramlau-Hansen et al. | 705/64 |
| 2009/0043663 A1 * | 2/2009 | Prater | 705/16 |
| 2009/0240592 A1 * | 9/2009 | Baumgart et al. | 705/17 |
| 2010/0106592 A1 * | 4/2010 | Brown | 705/14.34 |
| 2011/0066564 A1 * | 3/2011 | Larsen et al. | 705/318 |
| 2012/0290451 A1 * | 11/2012 | Jones et al. | 705/30 |
| 2012/0310828 A1 * | 12/2012 | Hu | 705/44 |
| 2013/0006861 A1 * | 1/2013 | McCoy et al. | 705/44 |
| 2013/0159171 A1 * | 6/2013 | McKernan et al. | 705/39 |
| 2013/0226797 A1 * | 8/2013 | Jiang et al. | 705/44 |

OTHER PUBLICATIONS

BankNews Media, Harland Financial Solutions: The business banking business, Anonymous, Bank News 107.11, Nov. 2007, 16 pages.*

* cited by examiner

METHOD AND SYSTEM FOR DEPOSITING FUNDS AT A POINT OF SALE TERMINAL

BACKGROUND OF INVENTION

Generally, in order to manage money, individuals, groups, businesses, governments and other account owners use a variety of financial accounts. Examples of financial accounts include, but are not limited to, investment accounts, savings accounts, checking accounts, retirement accounts, credit card accounts, loans and/or other financially-related accounts.

Different financial accounts generally have different accessibility and are, therefore, suitable for different purposes. For example, different financial accounts may have different mechanism to use for deposits and withdrawals. Some financial accounts may require a user to physically go to a bank to deposit or withdraw money. Some financial accounts may require wire transfers, whereas other financial accounts may require deposit and/or payments through the internet or over an automated phone system.

Further, most financial accounts require the financial account number for depositing and/or accessing funds associated with the financial account. For example, a user may use a debit card embedded with the financial account number to deposit money into a financial account at an automated teller machine (ATM). However, an appropriate ATM or bank associated with a financial account may not always be available for depositing money. For example, if a user is traveling and is in a geographic area not serviced by his or her bank, the user may not be able to deposit funds into an associated financial account.

SUMMARY OF INVENTION

In general, in one aspect, the invention relates to a method for depositing funds into a financial account. The method includes obtaining a deposit request by a point of sale (POS) terminal, wherein the deposit request comprises a virtual account number and a deposit amount, wherein the deposit amount matches an amount of funds received; identifying a financial account number associated with the virtual account number; and depositing funds matching the deposit amount into a financial account corresponding to the financial account number.

In general, in one aspect, the invention relates to a system for depositing funds into a financial account. The system includes an account repository comprising a plurality of virtual account numbers and a plurality of financial account numbers, wherein a virtual account number of the plurality of virtual account numbers is associated with a financial account number of the plurality of financial account numbers; a point of sale (POS) terminal operatively connected to the account repository and comprising functionality to: obtain a deposit request comprising the virtual account number and a deposit amount, wherein the deposit amount matches an amount of funds received; a financial engine receiving the deposit request from the POS terminal and comprising functionality to: operatively connect to the account repository to identify the financial account number associated with the virtual account number; and deposit funds matching the deposit amount into a financial account corresponding to the financial account number.

In general, in one aspect, the invention relates to a point of sale (POS) terminal for depositing funds into a financial account, comprising: a storage device comprising a plurality of virtual account numbers and a plurality of financial account numbers, wherein a virtual account number of the plurality of virtual account numbers is associated with a financial account number of the plurality of financial account numbers; a memory device; and a central processing unit operatively connected to the storage device and comprising functionality to execute software instructions, stored on the memory device, to: obtain a deposit request comprising the virtual account number and a deposit amount, wherein the deposit amount matches an amount of funds received; identify the financial account number associated with the virtual account number; and deposit funds matching the deposit amount into a financial account corresponding to the financial account number.

In general, in one aspect, the invention relates to a computer readable medium comprising instructions for depositing funds into a financial account, the instructions comprising functionality to: obtain a deposit request by a point of sale (POS) terminal, wherein the deposit request comprises a virtual account number and a deposit amount, wherein the deposit amount matches an amount of funds received; identify a financial account number associated with the virtual account number; and deposit funds matching the deposit amount into a financial account corresponding to the financial account number.

Other aspects and advantages of the invention will be apparent from the following description and the appended claims.

DETAILED DESCRIPTION

Figure 1:
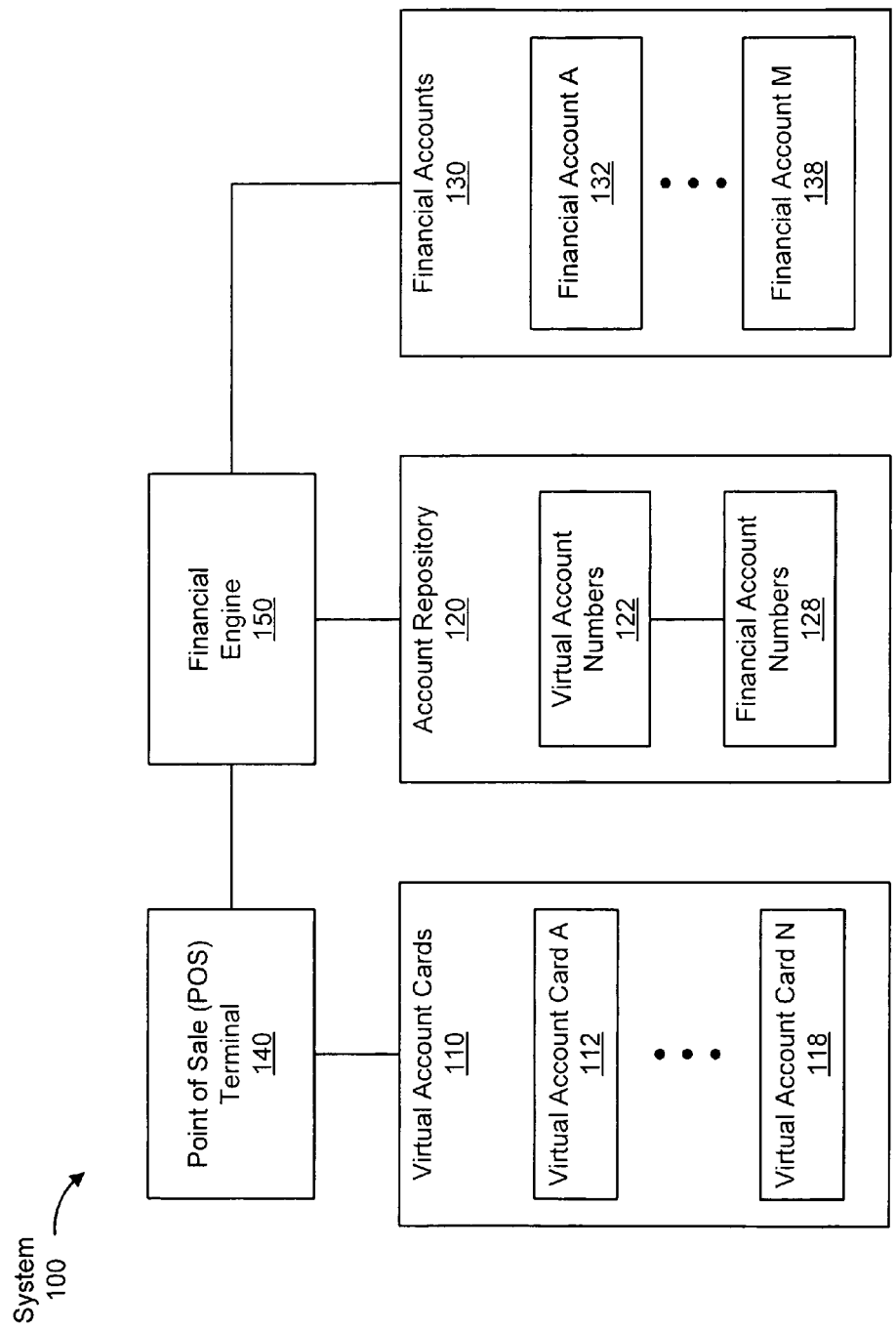
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method for managing a request for a financial transaction. Specifically, embodiments of the invention provide a method and system for obtaining a request for a financial transaction and redirecting the request based on financial accounts associated with the account owner.

FIG. 1 shows a system (100) in accordance with one or more embodiments of the invention. As shown in FIG. 1, the system (100) includes one or more of the following: virtual account card(s) (110), an account repository (120), financial account(s) (130), a point of sale (POS) terminal (140), and a financial engine (150). Each of these components are described below and may be located on the same device (e.g., a server, mainframe, desktop personal computer (PC), laptop, personal desktop assistant (PDA), television, cable box, satellite box, kiosk, telephone, mobile phone, or other computing devices) or may be located on separate devices coupled by a network (e.g., Internet, Intranet, Extranet, Local Area Network (LAN), Wide Area Network (WAN), or other network communication methods), with wire and/or wireless segments.

In one or more embodiments of the invention, the system (100) is implemented using a client-server topology. The system (100) itself may correspond to an enterprise application running on one or more servers, and in some embodiments could be a peer-to-peer system, or resident upon a single computing system. In addition, the system (100) is accessible from other machines using one or more interfaces (not shown). In one or more embodiments of the invention, the system (100) is accessible over a network connection (not shown), such as the Internet, by one or more users. Information and/or services provided by the system (100) may also be stored and accessed over the network connection.

Continuing with FIG. 1, the virtual account cards (110) ((e.g., virtual account card A (112) and virtual account card N (118)) correspond to any card, device, or other suitable information carrier that includes a virtual account number (122). The virtual account cards (110) may be of any size, shape, and format. In one or more embodiments of the invention, the virtual account cards (110) may be merchant cards with an encoded virtual account number (122). For example, a virtual account card may correspond to a supermarket discount card with an encoded virtual account number. Furthermore, the virtual account numbers (122) may be the supermarket account number itself or a separate account number. The virtual account numbers (122) may be encoded on the virtual account cards (110) using a magnetic strip, a bar code, optically scannable characters, visually readable characters, or in another suitable manner.

Each of the virtual account numbers (122) encoded on the virtual account cards (110) are also stored in the account repository (120) and associated with a financial account number (128). In one or more embodiments of the invention, the account repository (120) corresponds to a data repository that includes functionality to store the virtual account numbers (122) in association with the corresponding financial account numbers (128). In one or more embodiments of the invention, access to the account repository (120) is restricted and/or secured. As such, access to the account repository (120) may require authentication using passwords, secret questions, personal identification numbers (PINs), biometrics, and/or any other suitable authentication mechanism.

Those skilled in the art will appreciate that elements or various portions of data stored in the account repository (120) may be distributed and stored in multiple data repositories. In one or more embodiments of the invention, the account repository (120) is flat, hierarchical, network based, relational, dimensional, object modeled, or structured otherwise. For example, the account repository may be maintained as a table of a simple query language (SQL) database or a simple spreadsheet. In addition, data in the account repository (120) may be verified against data stored in other repositories.

Each of the financial account numbers (128) correspond to financial accounts (130) (e.g., financial account A (132) and financial account M (138). The financial accounts (130) may be any type of account, including, but not limited to savings accounts, checking accounts, business accounts, credit accounts, loan accounts, investment accounts, merchant accounts (e.g. a gift card), or any other account which can hold a credit and/or a debit of funds.

Continuing with FIG. 1, the POS terminal (140) corresponds to a process, program, and/or system that includes functionality to accept payment for a sale and accept a deposit request, in accordance with one or more embodiments of the invention. For example, the POS terminal may include functionality to scan a bar code on an item, determine the price associated with the item, and collect payment of the price for the sale of the item. In another example, the POS terminal may include functionality to collect payment for services by a consumer. Furthermore, the POS terminal (140) may include functionality to obtain a deposit request including a virtual account number (122) and a deposit amount (not shown) corresponding to funds received for deposit. The POS terminal (140) may include functionality to obtain the virtual account number (122) from a virtual account card (110) or through a keypad entry using an interface (not shown). The deposit amount may be received using an interface or alternatively, the deposit amount may be determined based on the amount of funds detected. In one or more embodiments of the invention, the POS terminal (140) may include functionality to obtain a single code and determine a virtual account number and a deposit amount from the single code. For example, the single code may correspond to a concatenation of the virtual account number and the deposit amount.

In one or more embodiments of the invention, the financial engine (150) corresponds to a process, program, or system that includes functionality to identify a financial account number (128) associated with a virtual account number (122) and deposit funds into the financial account (130) corresponding to the financial account number (128). The financial engine (150) may include functionality to identify the financial account number (128) associated a virtual account number (122) by querying the account repository (120) with the virtual account number (122). In one or more embodiments of the invention, the financial engine (150) may include functionality to determine the financial account number (128) by applying one or more functions to the virtual account number (122).

The financial engine (150) may include functionality to deposit funds into the financial account (130) corresponding to the financial account number (128). For example, the financial engine may interact with a financial institution (not shown) to request a deposit of funds into a financial account based on the amount of funds received. Furthermore, the financial engine (150) may include the functionality to provide the funds received to the financial institution. For example, the financial engine (150) may wire the funds received to the financial institution. In another embodiment of the invention, the financial engine (150) may be a component of a financial institution and may be able to add funds directly to a financial account (130).

Figure 2:
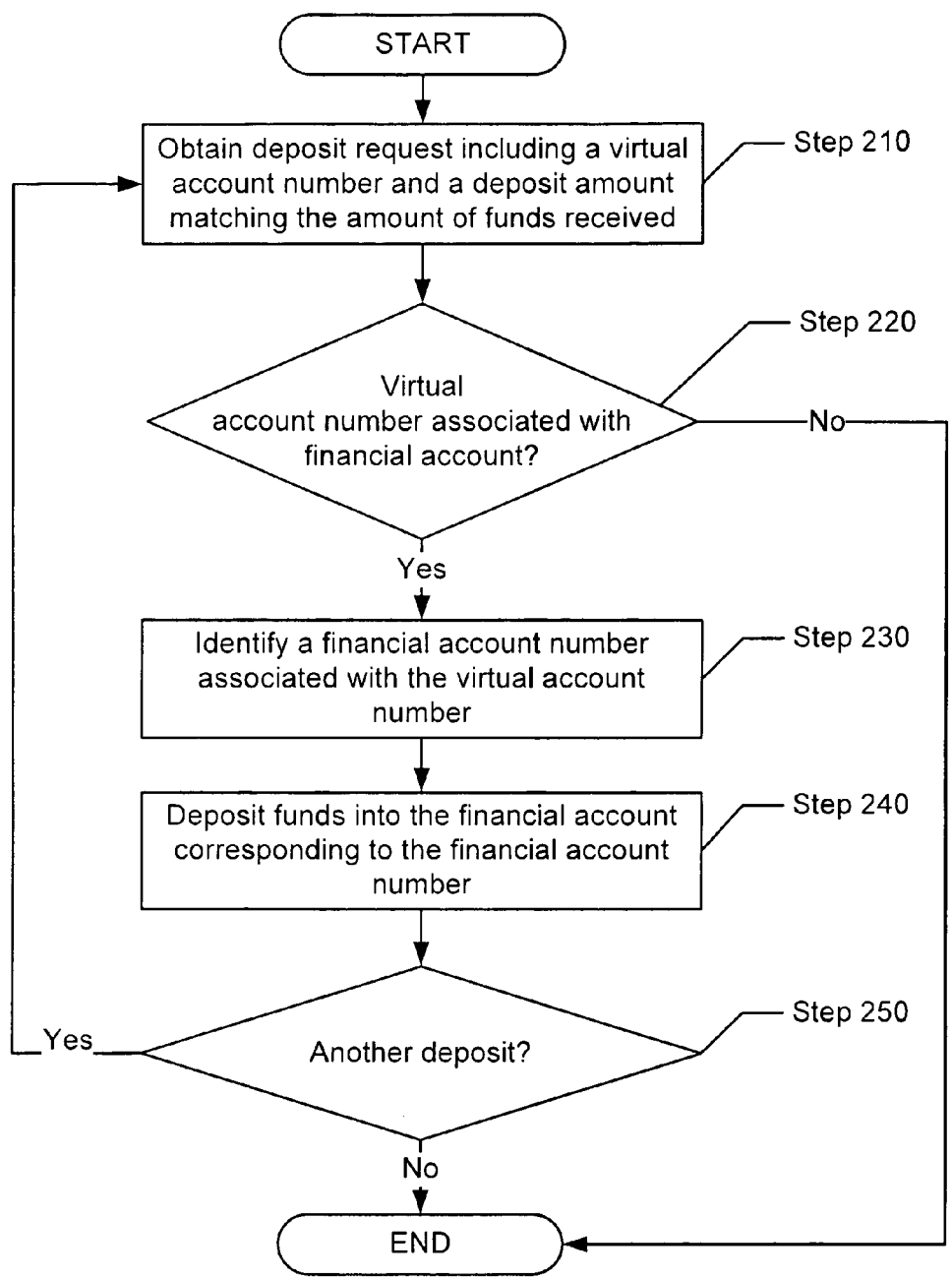
FIGS. 2 and 3 show flow charts in accordance with one or more embodiments of the invention.
Figure 3:
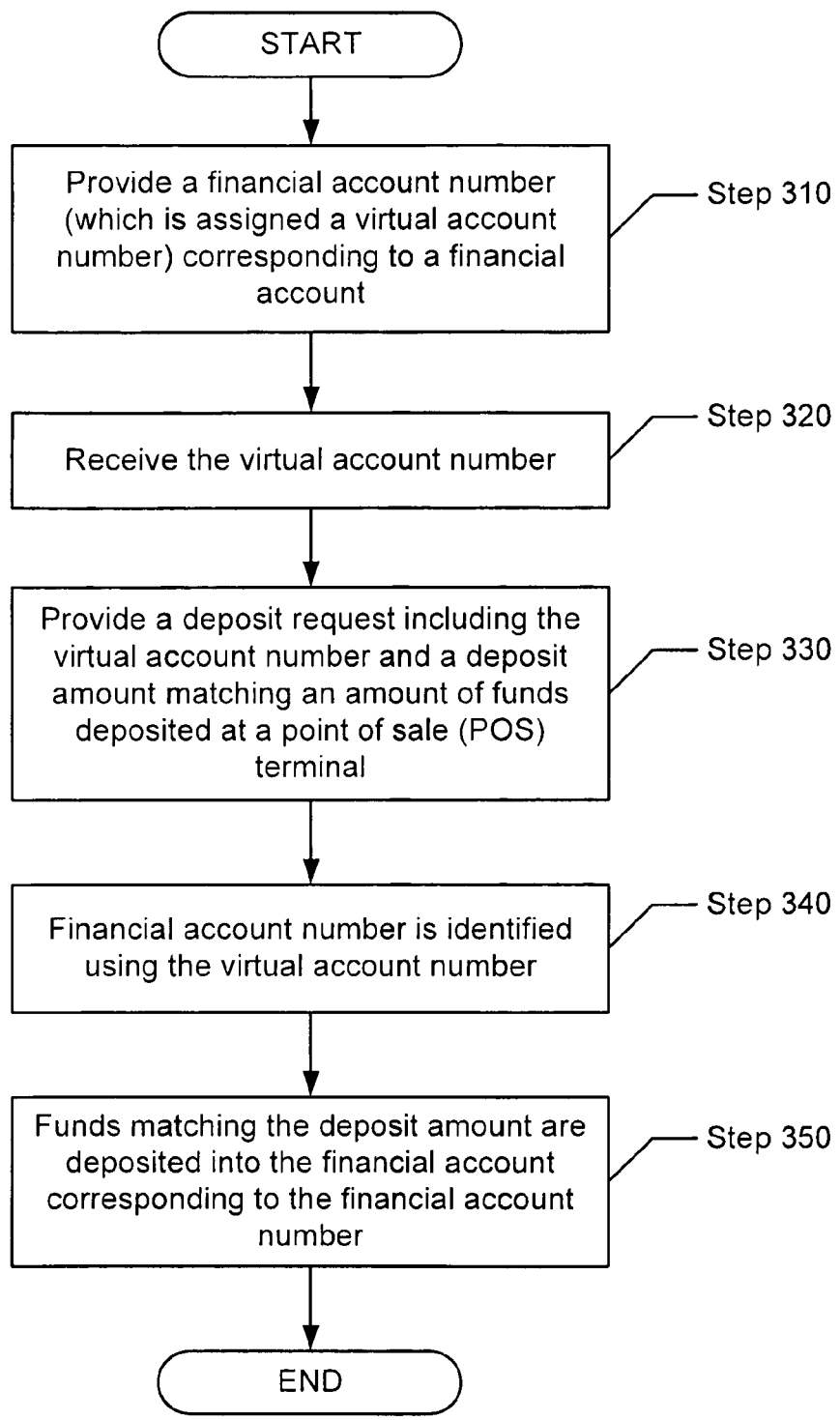

FIGS. 2 and 3 show flow charts in accordance with one or more embodiments of the invention. In one or more embodiments of the invention, one or more of the steps described below may be omitted, repeated, and/or performed in a different order. Accordingly, the specific arrangement of steps shown in FIGS. 2 and 3 should not be construed as limiting the scope of the invention.

Specifically, FIG. 2 shows a flow chart for depositing funds into a financial account, in accordance with one or more embodiments of the invention. Initially, a deposit request including a virtual account number and a deposit amount is obtained (Step 210). The deposit request may be actively obtained by presenting a prompt and receiving the deposit request in response. The deposit request may also be passively received simply by receiving a combination of a virtual account number and a deposit amount.

In one or more embodiments of the invention, a determination is made whether the virtual account number is associated with a financial account number (Step 220). The determination may be made by querying one or more sources using the virtual account number. In one or more embodiments of the invention, the virtual account number may be translated to a financial account number using one or more predetermined functions. Thereafter, the financial account number obtained from the translation may be verified against known financial account numbers to determine whether a match is found. If a match is found, then a financial account number corresponding to the virtual account number exists. In one or more embodiments of the invention, a query using the virtual account number results in identification of a financial account number (Step 230).

Next, the deposit amount obtained may be verified against an actual amount of funds received (not shown). Alternatively, verification may not be needed if the deposit amount is calculated by automatically detecting the amount of funds received. In another embodiment of the invention, if the deposit amount is entered by a trusted source (e.g., a financial institution employee or a receiving merchant employee), the deposit amount may not necessarily be verified.

In one or more embodiments of the invention, funds equivalent to the deposit amount are deposited into a financial account corresponding to the financial account number, where the virtual account number is associated with the financial account number (Step 240). The funds may be wired to the appropriate financial institution immediately upon receipt by a merchant, or sent using an alternate method or timing. For example, the funds may be sent on a periodic basis (e.g., daily, weekly, or monthly). In another embodiment of the invention, the funds may be sent electronically or by check. In one or more embodiments of the invention, funds received in the form of personal checks may not be deposited into the financial account until the check is verified and/or clears an authorizing bank account. Accordingly, in one or more embodiments of the invention, funds may be held until predetermined conditions are met and/or for a predetermined amount of time. In one or more embodiments of the invention, depositing funds may involve paying for an amount owed. For example, if the financial account is a credit card, depositing funds may result in credit applied toward a balance owed on a credit card or a loan. In another embodiment of the invention, depositing funds may correspond to investing funds into an investment account. For example, the funds may be deposited directly into a retirement investment account for stock purchase. Lastly, a decision is made whether to deposit additional funds (e.g., into a different account) (Step 250). If funds are to be deposited into another account, the process restarts at Step 210, however, if the same account is to be used for depositing additional funds, the process may restart at Step 240 using the previously identified financial account number.

FIG. 3 shows a flow chart for depositing funds into a financial account, in accordance with one or more embodiments of the invention. Initially, a financial account number corresponding to a financial account is provided (Step 310). The financial account number may be provided by an account holder, by an associated financial institution or by any other suitable entity. If a financial account is not available, a financial account may be created based on a consumer's authorization. The financial account number is then assigned a virtual account number for use to deposit funds into the financial account. The assigned virtual account number may be assigned randomly or based on a predetermined account generation system. For example, the virtual account number may be a combination of a consumer's driver license number, birth date, and/or other suitable information. In another embodiment of the invention, the virtual account number assigned to a consumer's financial account number may be a merchant account number associated with the consumer. In one or more embodiments of the invention, the virtual account number may be generated and assigned by a merchant and a financial institution in partnership.

Next the virtual account number is received (Step 320). The virtual account number may be received as embedded into a card or device, as an email, as a letter, or in any other suitable manner. In one or more embodiments of the invention, the virtual account number is received by a consumer directly from a merchant. The virtual account number may received immediately upon providing the financial account number or after a period of time for processing and assignment of the virtual account number.

In one or more embodiments of the invention, a deposit request is provided which includes the virtual account number associated with the financial account number, and funds for deposit (Step 330). In one or more embodiments of the invention, the financial account number may be provided by furnishing a card or device which includes the financial account number. In another embodiment of the invention, the financial account number may be entered using a keypad or scanned in through the use of a bar code. The funds may be deposited in the form of cash, check, or other suitable method. Further, the deposit amount may be entered separately, entered by a receiving employee, or simply may be determined based on the amount of funds submitted. Steps 340 and 350 are essentially the same as Steps 230 and 240, discussed above.

Figure 4:
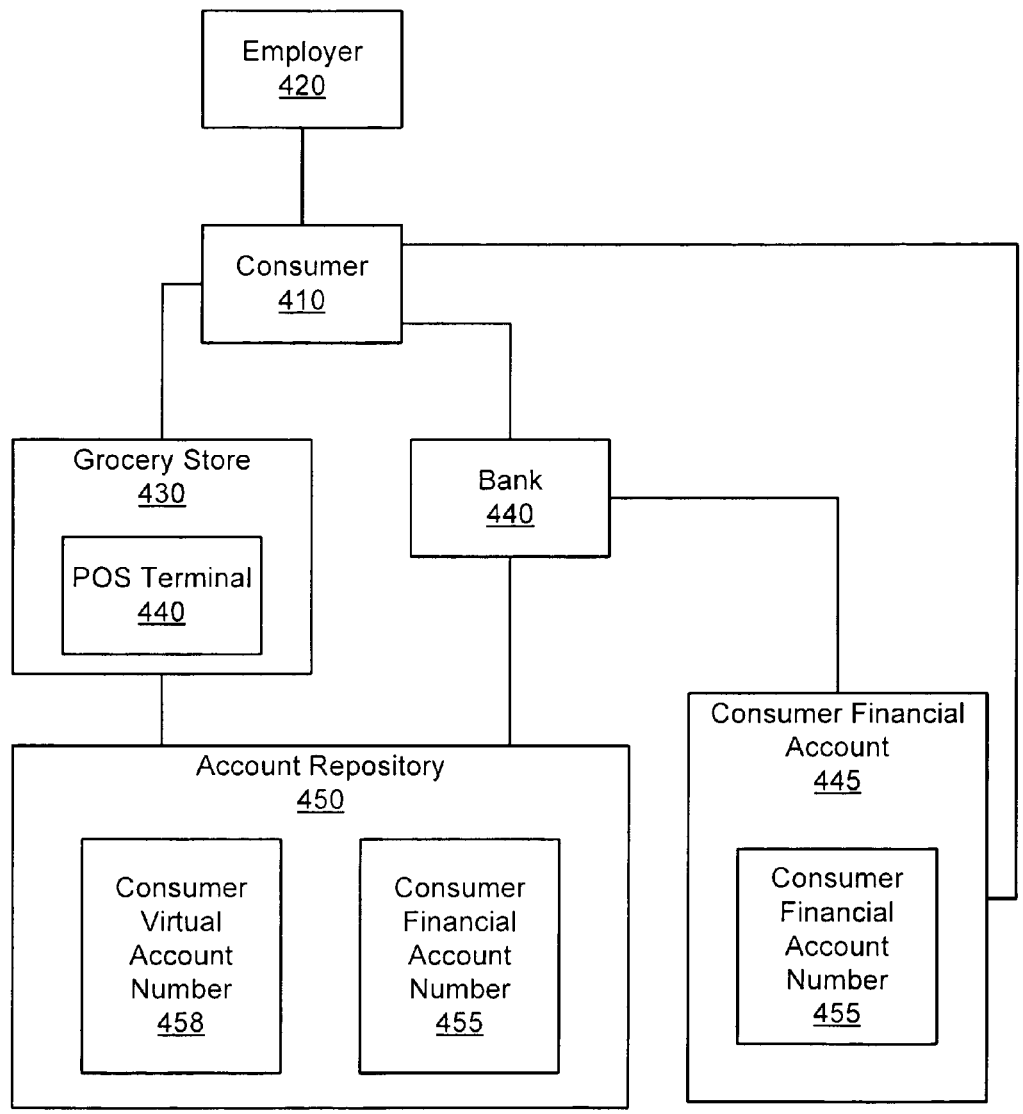
FIG. 4 shows an exemplary diagram in accordance with one or more embodiments of the invention.

FIG. 4 shows an exemplary diagram in accordance with one or more embodiments of the system. In the example shown in FIG. 4, a consumer (410) initially receives a paycheck from an employer (420) for four hundred dollars. Thereafter, the consumer (410) authorizes a purchase at a grocery store (430) and a deposit of the remainder in the bank (440), however, the consumer does not have a financial account. Accordingly, the consumer (410) first requests a virtual account number for deposits at the grocery store (430). The grocery store (430), based on the authorization of the consumer (410), interacts with the bank (440) to setup a consumer financial account (445) with a consumer financial account number (455) for the consumer (410). Furthermore the grocery store (430) assigns a virtual account number (458) to the consumer financial account number (455) and stores the two numbers in association in the account repository (450). Thereafter, the consumer (410) wishes the make a purchase for a hundred and fifty dollars at the grocery store (430) and deposit the remainder of the four dollar paycheck into the consumer financial account (445). Accordingly, the grocery store (430) is able to accept the paycheck written to the employee for four hundred dollars at the POS Terminal (440) with the consumer virtual account number (458). The grocery store (430) collects a hundred and fifty dollars of the paycheck for the groceries purchased by the consumer (410). Thereafter, the grocery store (430) wires the deposit balance of two hundred and fifty dollars and the consumer virtual account number to the bank (440). The bank, based on the virtual account number (458), is able to query the account repository (450) and obtain the consumer financial account number (455). Further, the bank then deposits the two hundred and fifty dollars received from the grocery store (430) into the consumer financial account (445) associated with the consumer financial account number (455). Accordingly, the consumer (410) is able to set up a consumer financial account (445), deposit funds into the consumer financial account (445) at the grocery store (430), and later withdraw directly from the consumer financial account (445).

Figure 5:
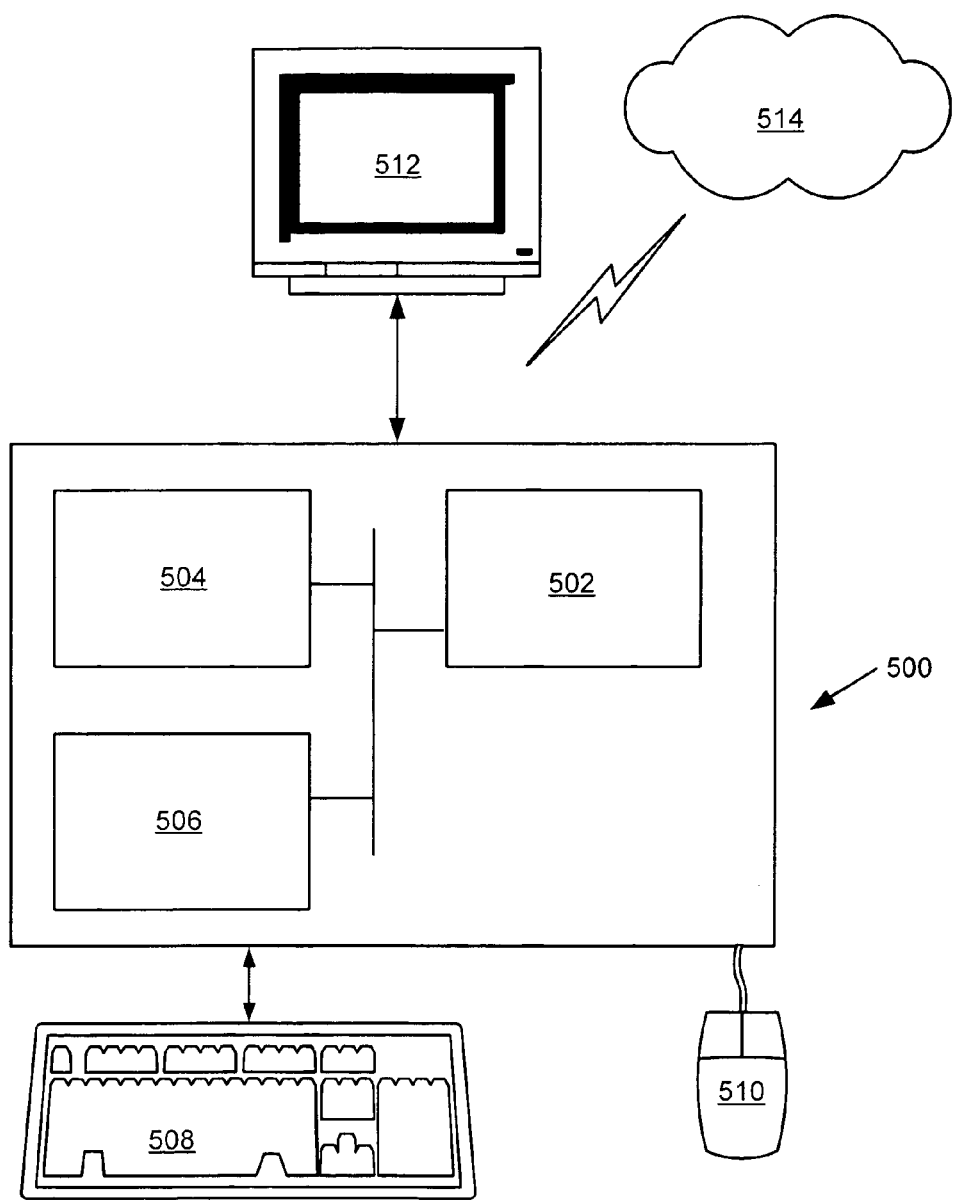
FIG. 5 shows a computer system in accordance with one or more embodiments of the invention.

Embodiments of the invention may be implemented on virtually any type of computer regardless of the platform being used. For example, as shown in FIG. 5, a computer system (500) includes one or more processor(s) (502), associated memory (504) (e.g., random access memory (RAM), cache memory, flash memory, etc.), a storage device (506) (e.g., a hard disk, an optical drive such as a compact disk drive or digital video disk (DVD) drive, a flash memory stick, etc.), and numerous other elements and functionalities typical of today's computers (not shown). The computer (500) may also include input means, such as a keyboard (508), a mouse (510), or a microphone (not shown). Further, the computer (500) may include output means, such as a monitor (512) (e.g., a liquid crystal display (LCD), a plasma display, or cathode ray tube (CRT) monitor). The computer system (500) may be connected to a network (514) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (500) includes at least the minimal processing, input, and/or output means necessary to practice embodiments of the invention.

Further, those skilled in the art will appreciate that one or more elements of the aforementioned computer system (500) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for depositing funds using a point of sale (POS) terminal by establishing a financial account, the method comprising:
   receiving, by the POS terminal of a merchant, a deposit request from a consumer of the merchant to deposit the funds by establishing the financial account;
   automatically generating, by a financial engine (FE) comprising at least one computer processor connected to a memory, the FE operatively connected to the POS terminal, a merchant account number associated with the consumer in response to the deposit request;
   sending, by the FE and after receiving the deposit request from the customer, an account generation request to a financial institution (FI) to set up the financial account for the consumer, wherein the deposit request exists before the financial account exists;
   receiving, by the FE, a financial account number for the financial account from the FI in response to the account generation request;
   assigning, by the FE, the merchant account number to the financial account number of the financial account;
   receiving, by the POS terminal, the funds from the consumer associated with the merchant account number;
   sending, by the FE operatively connected to the POS terminal, the financial account number associated with the merchant account number and the funds to the FI, wherein the funds are deposited into the financial account corresponding to the financial account number; and
   sending the merchant account number to the customer.

2. The method of claim 1, further comprising:
   receiving, from the consumer, a payment for a purchase, wherein the payment exceeds a cost of the purchase, and wherein the funds correspond to a difference between the payment and the cost of the purchase.

3. A method for establishing a financial account and depositing funds into the financial account using a point of sale (POS) terminal of a merchant, the method comprising:
   receiving, by a computer system of a financial institution (FI) comprising at least one processor connected to a memory, an account generation request from a financial engine (FE) operatively connected to the POS terminal, wherein the account generation request is automatically generated by the FE in response to a deposit request received by the FE from the POS terminal, and wherein the POS terminal is operated by a customer of the merchant;
   automatically establishing, by the computer system of the FI and in response to the account generation request, the financial account identified by a financial account number for the consumer of the merchant at the POS terminal;
   sending, by the computer system of the FI and to the FE, the financial account number, wherein the FE assigns a merchant account number associated with the customer to the financial account number, and wherein the FE sends the merchant account number to the customer;
   receiving, by the computer system of the FI and from the FE operatively connected to the POS terminal, the financial account number and the funds, wherein the funds are obtained from the consumer by the POS terminal; and
   depositing, by the computer system of the FI, the funds into the financial account corresponding to the financial account number.

4. The method of claim 3, wherein the funds correspond to a difference between a payment for a purchase and a cost of the purchase, and wherein the payment exceeds the cost of the purchase.

5. A system for depositing funds into a financial account by establishing the financial account, comprising:
   a point of sale (POS) terminal of a merchant comprising functionality to receive, from a consumer, the funds and a deposit request to deposit the funds by establishing the financial account; and
   a financial engine (FE) executing on a computer processor connected to a memory, the FE operatively connected to the POS, and comprising functionality to:
      automatically generate a merchant account number associated with the consumer in response to the deposit request;
      send an account generation request to a financial institution (FI) to set up a financial account for the consumer, wherein the deposit request exists before the financial account exists;

receive, from the FI, a financial account number for the financial account in response to the account generation request;

assign the merchant account number to the financial account number of the financial account;

send the financial account number associated with the merchant account number and the funds to the FI, wherein the funds are deposited into the financial account corresponding to the financial account number; and send the merchant account number to the customer.

6. The system of claim 5, wherein the funds correspond to a difference between a payment for a purchase and a cost of the purchase, and wherein the payment exceeds the cost of the purchase.

7. A system for establishing a financial account and depositing funds into the financial account using a (POS) terminal of a merchant, comprising:

a computer processor;

a memory device operatively connected to the computer processor; and a plurality of software instructions stored in the memory device and comprising functionality to:

automatically generate, in response to a deposit request received by the POS from a consumer of the merchant, a merchant account number for the consumer;

send an account generation request to a financial institution (FI) to set up the financial account for the consumer, wherein the deposit request exists before the financial account exists;

receive, from the FI, a financial account number for the financial account in response to the account generation request;

assign the merchant account number to the financial account number of the financial account;

send the financial account number associated with the merchant account number and the funds to the FI, wherein the funds are deposited into the financial account corresponding to the financial account number, and wherein the funds are received by the POS from the consumer; and send the merchant account number to the customer.

8. The system of claim 7, wherein the funds correspond to a difference between a payment for a purchase and a cost of the purchase, wherein the payment exceeds the cost of the purchase.

9. A non-transitory computer readable storage medium comprising instructions for depositing funds received by a point-of-sale (POS) terminal and from a consumer into a financial account by establishing the financial account, the instructions comprising functionality to:

automatically generate a merchant account number associated with the consumer in response to a deposit request received by the POS terminal;

send an account generation request to a financial institution (FI) to set up a financial account for the consumer;

receive, from the FI, a financial account number for the financial account in response to the account generation request, wherein the deposit request exists before the financial account exists;

assign the merchant account number to the financial account number of the financial account;

send the financial account number associated with the merchant account number and the funds to the FI, wherein the funds are deposited into the financial account corresponding to the financial account number; and send the merchant account number to the customer.

10. The non-transitory computer readable storage medium of claim 9, wherein the funds correspond to a difference between a payment for a purchase and a cost of the purchase, and wherein the payment exceeds the cost of the purchase.

* * * * *